(12) United States Patent
Loda

(10) Patent No.: US 8,078,354 B2
(45) Date of Patent: Dec. 13, 2011

(54) GLOBAL PRODUCT MANAGEMENT OF A VEHICLE AND A FLEET OF VEHICLES

(75) Inventor: David C. Loda, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 1204 days.

(21) Appl. No.: 11/605,986

(22) Filed: Nov. 29, 2006

(65) Prior Publication Data

US 2008/0126111 A1 May 29, 2008

(51) Int. Cl.
*G01M 17/00* (2006.01)
*G01M 15/14* (2006.01)

(52) U.S. Cl. .................. 701/35; 701/3; 701/29; 701/33; 701/99

(58) Field of Classification Search .................. 701/1, 3, 701/4, 7, 11, 14, 15, 16, 24, 29, 31, 33, 35, 701/36, 99, 120
See application file for complete search history.

(56) References Cited

U.S. PATENT DOCUMENTS

| | | | |
|---|---|---|---|
| 5,732,074 A | 3/1998 | Spaur et al. | |
| 6,438,468 B1 | 8/2002 | Muxlow et al. | |
| 7,251,554 B2 | 7/2007 | Loda et al. | |
| 2003/0105565 A1 | 6/2003 | Loda et al. | |
| 2003/0163591 A1 | 8/2003 | Loda | |
| 2003/0191568 A1* | 10/2003 | Breed | 701/36 |
| 2004/0206818 A1* | 10/2004 | Loda et al. | 235/424 |
| 2005/0027826 A1* | 2/2005 | Loda et al. | 709/219 |
| 2005/0165534 A1 | 7/2005 | Loda et al. | |
| 2005/0171651 A1 | 8/2005 | Loda et al. | |
| 2005/0197750 A1* | 9/2005 | MacDougall | 701/3 |
| 2006/0015777 A1 | 1/2006 | Loda | |
| 2006/0164239 A1 | 7/2006 | Loda | |
| 2006/0168090 A1 | 7/2006 | Loda et al. | |
| 2006/0241845 A1 | 10/2006 | Loda et al. | |
| 2007/0135979 A1* | 6/2007 | Plante | 701/35 |

FOREIGN PATENT DOCUMENTS

| | | |
|---|---|---|
| WO | 2006125014 A2 | 11/2006 |
| WO | 2007055720 A2 | 5/2007 |

OTHER PUBLICATIONS

Checkmate, GPS Fleet Solutions, Accessed: Mar. 25, 2005, http://www.passivegps.com/pdf/CHECKmate+Presentation.pdf.*
"Boeing: GoldCare—The 787 Revolution Now Revolutionizes Service", from http://www.boeing.com/commercial/goldcare/index.html, visited Nov. 6, 2006 (2 pages).

* cited by examiner

*Primary Examiner* — Khoi Tran
*Assistant Examiner* — Spencer Patton
(74) *Attorney, Agent, or Firm* — Kinney & Lange, P.A.

(57) ABSTRACT

A system and method for global product management includes an onboard microserver located on a vehicle, a plurality of subsystem microservers, and a ground mirror database configured to be located remote of the vehicle. The onboard microserver includes a computer processor, memory storage, and a web-based server enabling local and remote communications to and from the onboard microserver using standard internet protocols. The plurality of subsystem microservers are configured to communicate with the onboard microserver and each other. The ground mirror database includes a replica of data contained on the onboard microserver and the subsystem microservers, and the database and the onboard microserver are configured for two-way communications and data transfers. The ground mirror database operates as a gatekeeper for all information sent to and from the onboard microserver by monitoring, authorizing and controlling a dissemination of data to and from the onboard microserver.

35 Claims, 3 Drawing Sheets

GLOBAL PRODUCT MANAGEMENT OF A VEHICLE AND A FLEET OF VEHICLES

BACKGROUND OF THE INVENTION

The present invention relates to a system and method of global product management for a vehicle and a fleet of vehicles. More specifically, the present invention relates to a network centric architecture, including an onboard microserver system and a ground mirror database, for managing a fleet of vehicles.

An onboard microserver system may be used to create a network centric aircraft maintenance and management architecture for an aircraft, as well as other types of vehicles. The onboard microserver system allows data to be collected, stored and/or processed for the various subsystem components of the aircraft. The data may be converted into usable knowledge that is made available to selected users, such as maintenance personnel, suppliers and airline operators. Communications to and from the onboard microserver system, including a transfer of data, may be made locally and remotely using known communication means, including, but not limited to, satellite, cellular, wireless LAN, radio, and cable.

The onboard microserver system makes it easy to extract data from the aircraft locally or remotely. However, there is a need for a system and method to manage the communications and data transfers to and from the aircraft, including management down to a level of the subsystem controllers on the aircraft. Further, there is a need for the system to be able to manage this information for a plurality or a fleet of aircraft or other vehicles, combine the data and communications pertaining to each aircraft, and convert the data into usable information for managing a business.

BRIEF SUMMARY OF THE INVENTION

The present invention relates to a system and method for global product management. The system includes an onboard microserver located on a vehicle, a plurality of subsystem microservers, and a database configured to be located remote of the vehicle. The onboard microserver includes a computer processor, memory storage, and a web-based server enabling local and remote communications to and from the onboard microserver using standard internet protocols. The plurality of subsystem microservers are configured to communicate with the onboard microserver and each other. The database includes a replica of data contained on the onboard microserver and the subsystem microservers, and the database and the onboard microserver are configured for two-way communications and data transfers.

DETAILED DESCRIPTION

A net-centric global product management system is described herein for managing a vehicle or a fleet of vehicles. The system includes an onboard microserver network to be located on each vehicle for collecting, storing and processing data pertaining to the vehicle. A ground mirror database is configured to be located remote from the vehicle or vehicles and contain a replica of data on the onboard microserver for each vehicle. Moreover, the ground mirror database operates as a gatekeeper for all information sent to and from each onboard microserver by monitoring, authorizing and controlling a dissemination of data to and from the onboard microserver.

Figure 1:
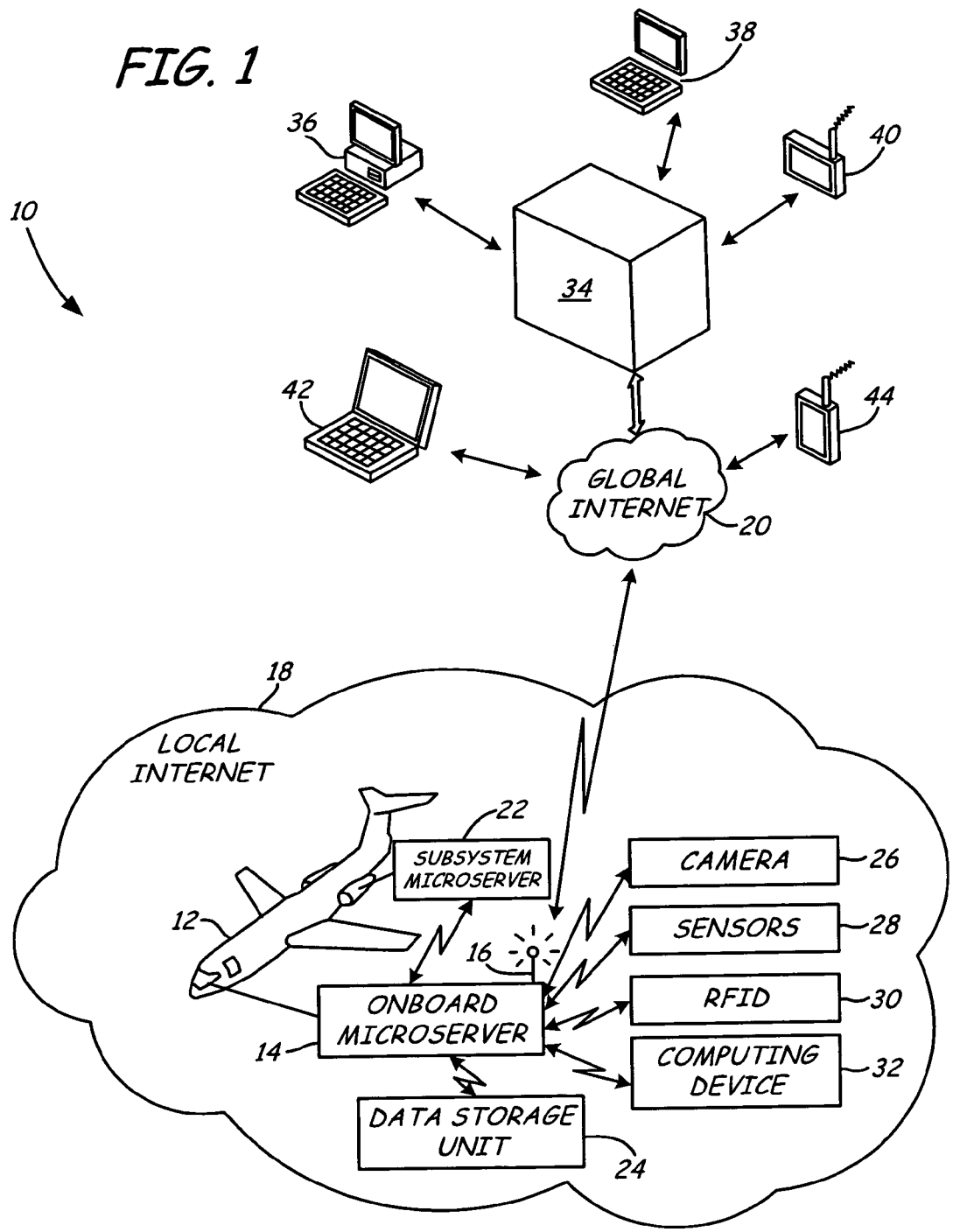
FIG. 1 is schematic of an onboard microserver system on an aircraft.

FIG. 1 is a schematic of onboard microserver system 10 for aircraft 12. System 10 includes onboard microserver 14, which is installed on aircraft 12. A similar system and corresponding microserver is disclosed in U.S. Patent Application Pub. No. US 2003/0105565.

Onboard microserver 14 creates a network centric aircraft maintenance and management architecture that is configured and reconfigurable to perform many applications and roles for aircraft 12. Such applications include hosting technical information and work instructions onboard the aircraft subsystem, tracking RFID (radio frequency identification) tagged parts for maintenance, tracking cargo modules for bagging using RFID, and other operational requirements. The open architecture system created by onboard microserver 14 allows for mass customization to convert various forms of data into usable knowledge without having to install or create new pieces of hardware for each application. Communication to and from microserver 14 may be through a wired or wireless connection, through satellite, cellular phones, wireless local area networks (WLAN), radio, cable, other microservers on the network, or any other communication means.

Onboard microserver 14 may be configured as a web-based server and a computer processor. As shown in FIG. 1, microserver 14 includes antenna 16, which generates a wireless system 18 (i.e. a local Internet) around aircraft 12. This makes it possible to have two-way wireless communication between aircraft 12 and an onboard computing device through the local Internet. Through microserver 14, it is also possible to have two-way wireless communication with a remote computing device through global Internet 20, as shown in FIG. 1.

Microserver 14 may be installed in the cabin, or any other area of aircraft 12 using existing test ports already wired into the engine/airframe. Microserver 14 may be used to host its own web page that is dedicated to aircraft 12; as a result, microserver 14 may then act as the data gateway to any component of aircraft 12 that is connected to microserver 14. Some or all of the subsystem components of aircraft 12 may each have its own microserver, like subsystem microserver 22 of FIG. 1, which is similar to onboard microserver 14. As a result, the subsystem microservers may each have their own corresponding web pages. For example, subsystem microserver 22 may be mounted to one of the engines (not shown) on aircraft 12. Additional subsystem microservers (not shown) may be similarly mounted or attached to other subsystems of aircraft 12.

Onboard microserver 14 and subsystem microserver 22 are able to communicate through a wired network connection or a wireless connection. A two-way arrow between microserver 14 and subsystem microserver 22 in FIG. 1 indicates a two-way wireless connection; however, it is recognized that a wired connection may also be used.

Microserver 14 may also be connected to data storage unit 24, camera 26, sensors 28, RFID (radio frequency identification) 30, and computing device 32. Sensors 28 may include any type of sensor that provides useful information for operation of aircraft 12, including, but not limited to, vibration or temperature sensors. The various components that are connected to microserver 12 (data storage unit 24, camera 26, sensors 28, RFID 30, and computing device 32) also have a two-way arrow in FIG. 1 between each component and microserver 14, indicating a two-way wireless connection. However, similar to subsystem microserver 22, it is recognized that any of these components may have a wired connection to onboard microserver 14. It is also recognized that additional components not shown in FIG. 1 may easily be connected to microserver 14.

Antenna 16 of onboard microserver 14 creates a hotspot around aircraft 12, such that any user on aircraft 12 may login locally to microserver 14 through the local Internet using any type of computing device 32. Users at a remote location may access microserver 14 remotely using the web page address dedicated to aircraft 12. Note that access is predicated on authorization and is secure, using any number of known encryption and/or portal technologies.

Remote access to microserver 14 is possible due to two-way wireless communication between wireless system 18 and global Internet 20. Portal 34, as shown in FIG. 1, may access data from microserver 14 through global Internet 20. Portal 34 functions as a central server that limits access to certain users. Data gathered by microserver 14 may be synchronized to portal 34 as desired. For example, microserver 14 may be programmed to periodically synchronize data to a server hosting portal 34 or to download data on specific events, such as when aircraft 12 lands. As another example, microserver 14 may also synchronize data to portal 34 upon activation of a switch by an operator onboard aircraft 12. Portal 34 may also synchronize data to microserver 14. For example, portal 34 may upload technical manuals or updates to microserver 14 for access by maintenance personnel.

Multiple users may access portal 34 simultaneously. For example, in FIG. 1, computing devices 36 and 38, as well as cell phone 40, are shown as having wireless communication with portal 34. Alternatively, these devices could have a wired connection to portal 34. A personal digital assistant (PDA), as well as other types of computing devices, may similarly be used to access portal 34. Alternatively, computing devices, operated by multiple users, may access data from microserver 14 directly through global Internet 20. As shown in FIG. 1, computer 42 and cell phone 44 may connect to global Internet 20 in order to access microserver 14.

Onboard microserver 14, and resulting wireless system 10, may be used for coordinating aircraft maintenance, employee training, supply chain, and much more. For example, if a remote user, such as a supplier, needs to access data for an engine of aircraft 12, the user can access operating data by simply logging onto the web page for onboard microserver 14 of aircraft 12, and more specifically to the web page for the server of that engine, if applicable. For security purposes, microserver 14 may be provided with a firewall and security protocols known only to selected individuals, or microserver 14 may utilize additional software or hardware encryption devices and operate as a private network/internet.

Onboard microserver system 10 makes it feasible to collect, process and store data for various components on aircraft 12. For example, as mentioned above, subsystem microserver 22 may be connected to one of the engines on aircraft 12. By monitoring the engine and collecting data on subsystem microserver 22, onboard microserver system 10 has an ability to provide this data to interested parties throughout an operational life of the engine.

System 10 uses a product centric approach, which, in simple terms, means that, to gather or post the most useful and up to date information and data about the product, go directly to the product. Continuing to use the engine of aircraft 12 as an example, under the product centric approach, information about the engine is collected by subsystem microserver 22 and stored on microserver 22. Moreover, specific information pertaining to the components of the engine, including, for example, operating data and maintenance data on individual parts of the engine (e.g. a fuel pump) is also stored on microserver 22 and the data may be correlated or combined with other information, regardless of whether the other information is located on or offboard aircraft 12. Data stored on system 10, which includes subsystem microserver 22, may be accessed through a computing device that is either local or remote to aircraft 12. Moreover, two-way communications to and from subsystem microserver 22, including a transfer of data, are also possible through system 10.

System 10 may be used to manage and optimize operation of aircraft 12. Onboard microserver 14 is configured to communicate with subsystem microserver 22 and any additional subsystem microservers on aircraft 12. Moreover, system 10 facilitates communication between the various subsystem microservers, providing the opportunity for aircraft 12 to operate more efficiently.

Onboard microserver systems similar to system 10 may be used on multiple aircraft similar to aircraft 12 or on any other type of aircraft. A system and method is described below for managing a plurality of aircraft or a fleet of aircraft using the onboard microserver architecture described above. This system and method utilizes the onboard microserver system described above in combination with a ground mirror database to globally manage a transportation business, which may include one or more fleets of vehicles.

Figure 2:
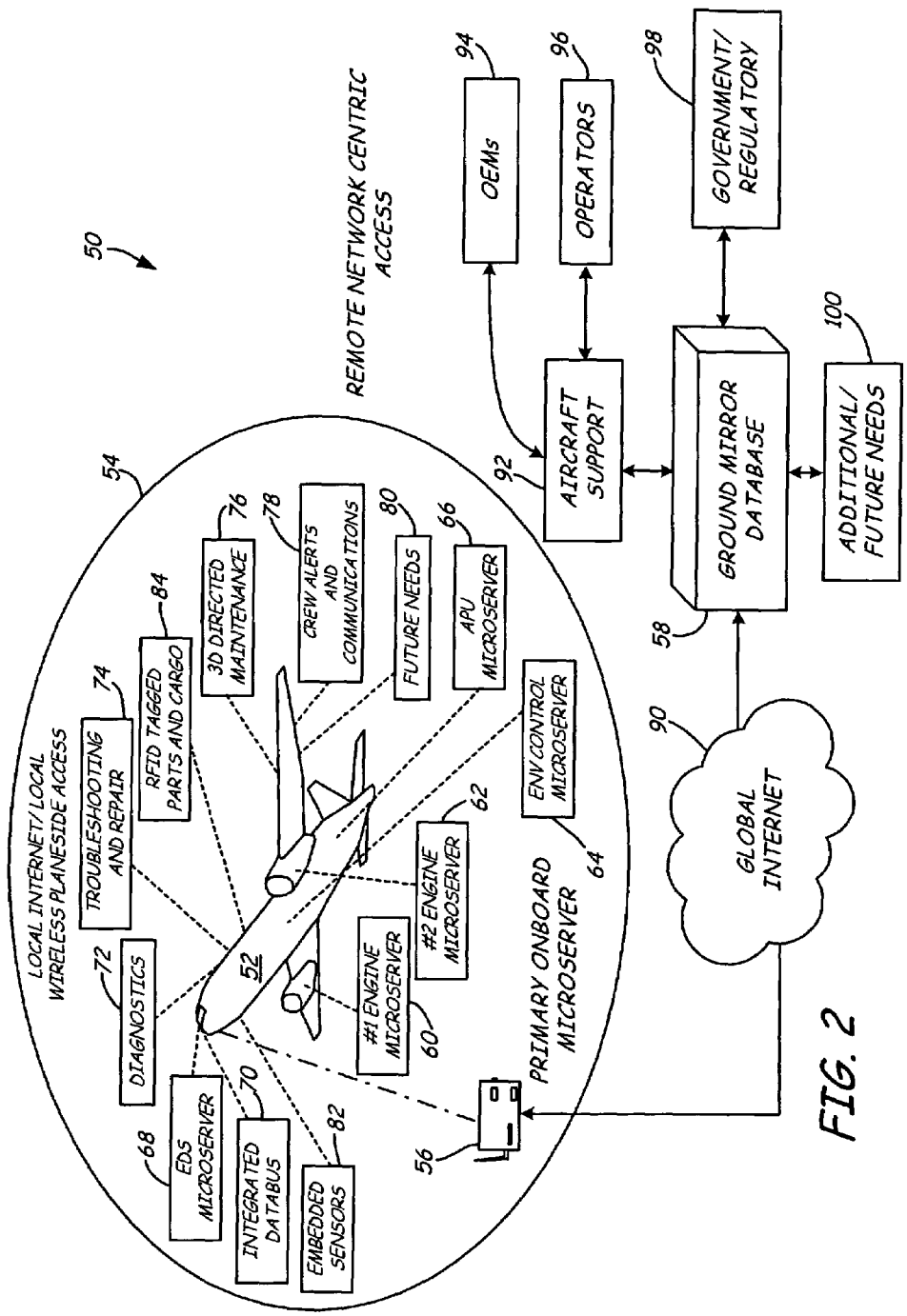
FIG. 2 is a schematic of a net-centric global product management system, including an onboard microserver system, similar to the system illustrated in FIG. 1, and a ground mirror database.

FIG. 2 is a schematic of net-centric global product management system 50 for aircraft 52. Management system 50 enables two-way communications and a two-way information transfer to and from aircraft 52. System 50 includes two communications routes—local internet/local wireless planeside access 54 and remote network centric access, which is defined as any area outside of local internet 54. Local internet 54 is created by primary onboard microserver 56, which is similar to onboard microserver 14 of FIG. 1. Management system 50 focuses on use of ground mirror database 58 in combination with onboard microserver 56.

Primary onboard microserver 56 works in conjunction with subsystem microservers on aircraft 52 that are similar to subsystem microserver 22 of FIG. 1 and are configured to connect to subsystem controllers or other electronics or components on aircraft 52. The main subsystem controllers on aircraft 52 include an engine controller for each engine, an auxiliary power unit (APU) controller, an environmental control unit controller, and an electrical distribution system (EDS) controller. Each of these subsystem controllers may each have their own subsystem microserver, as illustrated in FIG. 2 by #1 Engine Microserver 60, #2 Engine Microserver 62, Env. Control Microserver 64, APU Microserver 66, and EDS Microserver 68. Onboard microserver 56 also works in conjunction with integrated databus 70 on aircraft 52, which may include ARINC 529, MIL 1553 and Ethernet.

In addition to subsystem microservers 60, 62, 64, 66 and 68, system 50 may include additional subsystem microservers that are attached to other avionics boxes or components on aircraft 52. A subsystem microserver may be attached to any piece of electronics or any other type of component on aircraft 52 (for example, an hydraulic actuator). If a VHF radio on aircraft 52 was exhibiting intermittent problems, a subsystem microserver may be attached to the VHF radio to collect, store and process data pertaining to operation of the radio. Moreover, a subsystem microserver may operate as a stand-alone unit or be used in conjunction with an individual sensor or a group of sensors that may be added to system 50 at any time. It is recognized that system 50 is not limited to subsystem microservers 60, 62, 64, 66 and 68 of FIG. 2.

Onboard microserver 56 and subsystem microservers 60, 62, 64 and 66 are able to host a variety of information and data pertinent to operation of aircraft 52. For example, as shown in FIG. 2, microserver 56 and the subsystem microservers host data and information to aid and support in diagnostics 72, troubleshooting and repair 74, three-dimensional directed maintenance 76, and crew alerts and communications 78.

Onboard microserver 56 may also be connected to embedded sensors 82, as shown in FIG. 2, such that data from sensors 82 may be stored and processed on onboard microserver 56. Sensors 82 may have a wired or wireless connection to onboard microserver 56, and may include any type of sensing device. The architecture of onboard microserver 56 makes it easy for additional sensors to be integrated onto aircraft 52 at any time. The sensors may be connected to onboard microserver 56 or to any of subsystem microservers 60, 62, 64, and 66. Additional software may be easily loaded onto the microserver to support the sensors.

As also shown in FIG. 2, onboard microserver 56 is connected to RFID tagged parts and cargo 84. Parts are commonly tracked during manufacturing using radio frequency identification (RFID). As explained in further detail below, RFID technology may be used in combination with onboard microserver 56 to continue to track and monitor parts once the parts have left a manufacturing facility and entered the field (i.e. aircraft 52). Similarly, cargo may also be tracked throughout its transport using RFID technology.

FIG. 2 illustrates some of the functionalities made possible through onboard microserver 56. However, it is recognized that microserver 56 has additional functions and capabilities that may not be explicitly illustrated in FIG. 2. Moreover, it is recognized that additional software and features may be easily added to onboard microserver 56 to accommodate future needs 80, as shown in FIG. 2, which may originate with original equipment manufacturers (OEMs), airline operators or regulatory agencies.

Onboard microserver 56 makes it possible to extend an information network from the factory, where a product or part is built, into the field where the product or part is used. As stated above, products or parts are commonly tracked in the factory using RFID; however, once the part is out into the field it may be difficult to monitor the part and easily have access to data about the part. Onboard microserver 56 makes it feasible to continue to track the part once it is out into the field, thus providing valuable information to OEMs and operators. Similarly, microserver 56 facilitates monitoring of a sub-assembly or assembly that the part may be inserted into. By being able to track a part or an assembly throughout its operational life, onboard microserver 56 provides complete availability to information about the part.

Management system 50 focuses on using onboard microserver 56 in combination with ground mirror database 58, which is configured to contain a replica or duplicate copy of data contained on onboard microserver 56. Data on onboard microserver 56 may include, but is not limited to, raw data collected by onboard microserver 56 or its subsystem microservers, data that has been processed or converted on onboard microserver 56 or combined with other data, and information that has been loaded onto onboard microserver 56. Ground mirror database 58 is configured to monitor and manage a transfer of information, including any type of communication or data, to and from onboard microserver 56. Moreover, ground mirror database 58 is configured to perform this functionality simultaneously for a plurality of aircraft, and thus may be used for management of a fleet of vehicles or an entire business.

Systems exist for gathering data or information from a plurality of vehicles and compiling that information into a central repository which may then be made available to a plurality of users. However, those systems are limited to a one-way transfer of information from the vehicles to the central repository, and may not provide the capability to disseminate information from the central repository back out to the vehicles.

Net-centric global product management system 50 is designed for a two-way transfer of information between ground mirror database 58 and onboard microserver 56. Ground mirror database 58 is the strategic center of gravity or gateway for managing and controlling all information to and from onboard microserver 56. Everything intended to be sent to onboard microserver 56 goes first through ground mirror database 58; everything going from onboard microserver 56 to an outside source goes first through ground mirror database 58. As the gatekeeper, ground mirror database 58 reviews, authorizes and controls dissemination of information to and from onboard microserver 56. Ground mirror database 58 ensures that information from onboard microserver 56 is routed properly to only those users authorized for receiving that information. As described below, ground mirror database 58 also ensures that data sent to onboard microserver 56 is authorized to be released.

Ground mirror database 58 is a portal that is capable of storing data from a plurality of aircraft, which includes aircraft 52. Database 58 organizes data from aircraft 52 in a manner that mirrors an organization of data on primary onboard microserver 56 and subsystem microservers 60, 62, 64, 66 and 68, as explained in more detail below with reference to FIG. 3. Ground mirror database 58 is configured to allow a plurality of users local or remote to database 58 to have access to data on database 58. Database 58 includes security protocols to ensure that only authorized users are able to access data from database 58. Moreover, database 58 includes an ability to designate specific portions of data to specific users. Ground mirror database 58 is also configured to send and receive communications to and from onboard microserver 56.

Onboard microserver 56 and ground mirror database 58 are able to communicate with one another using any known communication means, including, but not limited to, radio frequency, optical, satellite, cellular, WLAN, wired, wireless, radio or cable. The communication means may vary as a function in part of a location of onboard microserver 56 relative to ground mirror database 58. In many cases a wireless communication means may be used. However, if onboard microserver 56 is in proximity to ground mirror database 58 or a network hosting database 58 (e.g. at an airport gate or in a hanger), then onboard microserver 56 may use a data cable to plug into ground mirror database 58 or its corresponding network.

As shown in FIG. 2, if onboard microserver 56 is not located in close proximity to ground mirror database 58, remote communications are made possible through global internet 90. As described in further detail below, onboard microserver 56 and ground mirror database 58 periodically synchronize with one another to provide an updated copy of information on onboard microserver 56 to database 58 and to transfer any communications to or from onboard microserver 56.

Ground mirror database 58 may be in two-way communication with various users that have an interest in data from microserver 56, as shown in FIG. 2. For example, aircraft support 92 may represent numerous parties, including OEMs 94 and operators 96, that may benefit from information stored on onboard microserver 56. Government/regulatory 98 represents various parties responsible for monitoring operation of the airline industry and managing airline regulations. Ground mirror database 58 is configured to coordinate communications and a transfer of data between users 92, 94, 96 and 98 and onboard microserver 56. Moreover, ground mirror database 58 is configured to easily accommodate additional users as it becomes necessary or beneficial, as represented by additional/future needs 100. Communications between database 58 and users 92, 94, 96 and 98 may be through any of the communications means provided above.

As explained above in reference to FIG. 1, the architecture of the onboard microserver system enables local and remote communications between an onboard microserver and a plurality of users. Thus, users 92, 94, 96 and 98 may communicate directly with onboard microserver 56 without having the communication routed through ground mirror database 58. However, from a management perspective, there are benefits to having all communications and data transfers go through ground mirror database 58. In a preferred embodiment of system 50, onboard microserver 56 may not send or receive information during normal operations without going through database 58.

As explained above, ground mirror database 58 includes security protocols to ensure that the information is being disseminated only to authorized users. Although an onboard microserver may also include these types of safeguards, information relating to authorization may be more easily controlled by ground mirror database 58, which may manage information for more than one aircraft. Thus, if there is a change or update relating to authorization, database 58 may apply the change across the plurality of aircraft managed by database 58. Database 58 may be better able than onboard microserver 56 to ensure that authorization information is kept up to date.

Moreover, routing all communications through database 58 provides a safeguard to ensure that data is not released to onboard microserver 56 until authorization or approval is complete. In some cases, data being sent to onboard microserver 56 may require approval by more than one user. For example, a service update may first be approved by a component OEM (OEM 94) who may then send the update to database 58. However, in some cases the service update may need to be authorized by regulatory agency 98 and/or another OEM, such as an airframe OEM. Thus, database 58 may provide a holding bin for temporarily restricting release of the data until the data is authorized by regulatory agency 98 and/or other designated users.

Onboard microserver 56 collects, processes and stores a variety of data about aircraft 52 on onboard microserver 56, including data for its corresponding subsystem microservers 60, 62, 64, 66 and 68. When aircraft 52 is operating, data is continuously being collected by onboard microserver 56. Even at times when aircraft 52 is not operating, onboard microserver 56 may be collecting data. For example, if aircraft 52 is grounded due to a periodic maintenance check, parts on aircraft 52 may be repaired or replaced. Because parts may be tagged and tracked on aircraft 52 using RFID, onboard microserver 56 may include data as to which part within aircraft 52 was replaced, when it was replaced, and what it was replaced with.

Generally speaking, real-time information on microserver 56 is always changing. As a result, a decision arises as to how often ground mirror database 58 should be synchronized with microserver 56 to receive an updated replica of information on microserver 56. Similarly, ground mirror database 58 may receive information at any time from users 92, 94, 96 or 98 that is intended to be sent to onboard microserver 56.

It is likely not cost-effective to have an essentially continuous synchronization between onboard microserver 56 and ground mirror database 58. Thus, a program for controlling synchronization between microserver 56 and database 58 may be designed in numerous ways. Synchronization may be a function of time, available communications means, and a characterization of the urgency or importance of the updated information. For example, a routine update to aircraft 52 from airline operator 94 is most likely not critical. In that case, the updated information may not be sent from database 58 to microserver 56 until a wireless LAN link is available for aircraft 52, which may, for example, be at the gate of an airport. Alternatively, as described above, onboard microserver 56 may be able to have a wired connection to ground mirror database 58. Upon recognition by database 58 that onboard microserver 56 has a hard-wired connection, a synchronization of data between onboard microserver 56 and ground mirror database 58 may easily be performed.

On the other hand, if database 58 receives an urgent message from OEM 94, database 58 may use a more expensive communications channel to route the message from OEM 94 to onboard microserver 56. As an example, if aircraft 52 was in flight and database 58 received a communication from OEM 94 that an engine controller on aircraft 52 had been recalled due to malfunctioning, database 58 may immediately send the communication from OEM 94 to onboard microserver 56, even though the communication must be sent using a ground to air satellite system. The communication is ultimately routed to the subsystem microserver for that engine controller. Database 58 may also send communications to onboard microserver 56 to alert crew members onboard aircraft 52 if an issue arises.

In some embodiments, management system 50 may be configured such that database 58 is able to send commands from one of users 92, 94, 96 or 98 to one or more of the subsystem microservers on aircraft 52 to remotely control the subsystems (e.g. an engine) of aircraft 52. In those cases, database 58 may include more stringent security protocols, and this capability would be limited to minimal users under special circumstances. The security protocols on database 58 may be used in conjunction with security protocols on onboard microserver 56. The architecture of management system 50 allows for implementation of embedded algorithms and/or intelligent agent technology (located on board and/or off board aircraft 52) to enable an automated self leveling, self optimizing global supply chain network for the factory and the field.

As stated above, onboard microserver 56, in combination with subsystem microservers 60, 62, 64, 66 and 68, provides complete information about parts or products on aircraft 52. Again, this is feasible by monitoring the part during manufacturing and then continuing to monitor the part once it is out in the field (i.e. on aircraft 52). Onboard microserver 56 collects and stores data pertaining to how long a particular part has been in use (e.g. part of an assembly) and under what conditions. As a result, onboard microserver 56 provides the ability to predict when a particular part or sub-assembly may fail or wear out, and thus require repair or replacement. This provides the ability for more efficient supply chain management and more accuracy for determining when to deliver replacement parts. If a replacement part was taken from another aircraft to aircraft 52, an RFID tag on the replacement part may be read by aircraft 52 and the information pertaining to the part is automatically transferred from the other aircraft to aircraft 52. Thus, all information pertaining to the replacement part follows with the part.

Moreover, when a technician or a mechanic travels to aircraft 52 to perform the necessary maintenance, onboard microserver 56 is able to host a variety of information, as shown in FIG. 2, to aid in the maintenance process, including instructions on diagnostics 72, troubleshooting and repair 74, and 3D directed maintenance 76. For example, if a part on the #1 engine requires replacement, microserver 60 for the #1 engine may host a 3D model of the engine directing the technician where to find the part requiring replacement, as well as specific instructions on performing the replacement, which may be driven by fault or diagnostic information from the engine controller and/or from other sources.

The capabilities of onboard microserver 56 together with ground mirror database 58 provide an opportunity for a more efficient operation of aircraft 52. As described immediately above, onboard microserver 56 collects, stores and processes data about how long a particular part has been in use and its projected replacement date. The projected replacement date may change as a result of operating hours for aircraft 52 and variable conditions. Because all of this data is also stored on ground mirror database 58, OEMs 94 may access the data and use it to aid in their decisions pertaining to manufacturing schedules, inventory, etc. Historically, in order to distribute data in this manner, the data had to be distributed through a chain of people. Because ground mirror database 58 includes appropriate safeguards and security protocols for limiting access to authorized users, routine distribution of this information may be automated.

Various other aircraft, like aircraft 52 of FIG. 2, may be connected to ground mirror database 58 in a similar manner to the connection between aircraft 52 and database 58 through onboard microserver 56. Ground mirror database 58 is designed to support a plurality of aircraft, as explained below in reference to FIG. 3. It is recognized that, in alternative embodiments, ground mirror database 58 may be dedicated to a single aircraft.

Figure 3:
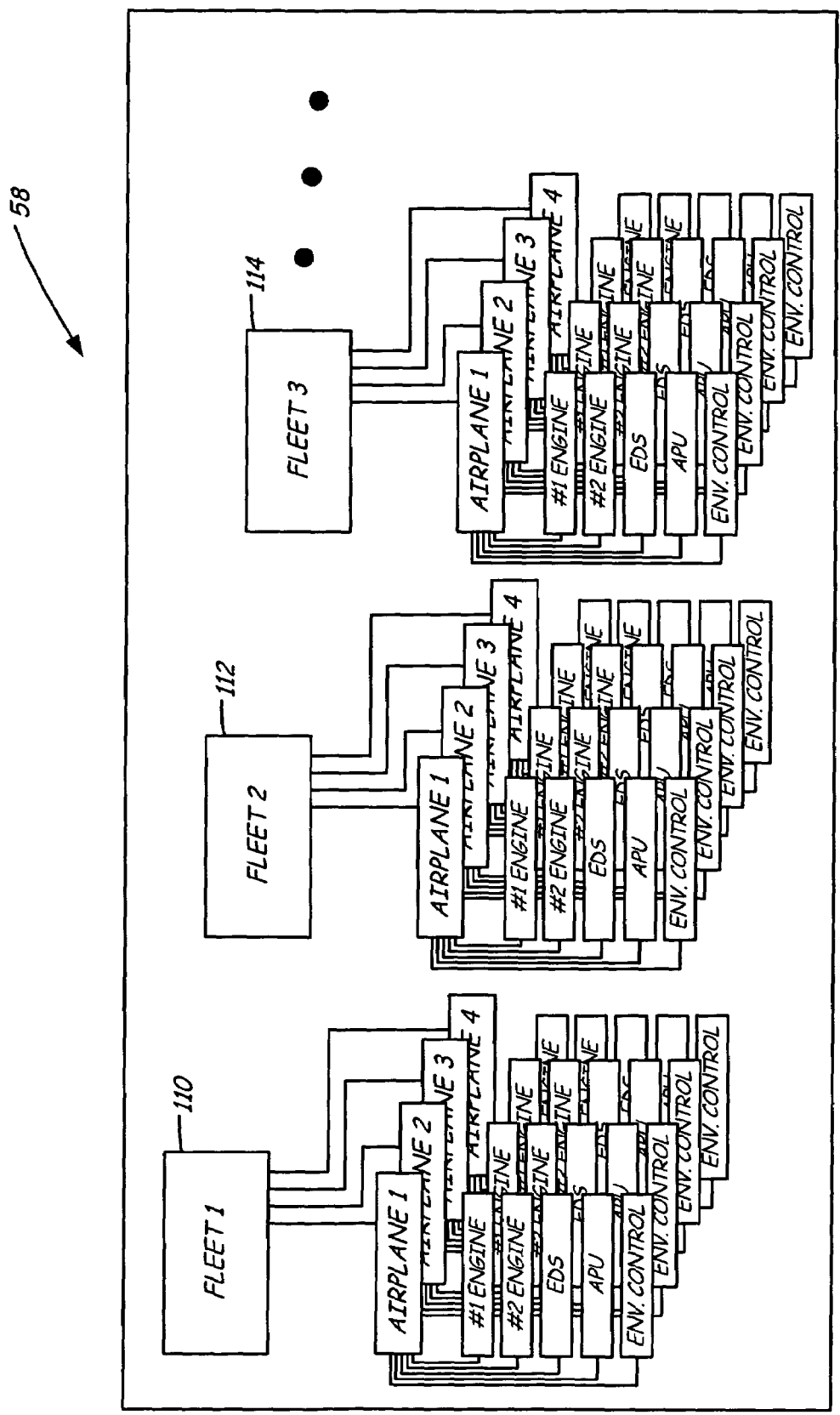
FIG. 3 is a schematic of the ground mirror database of FIG. 2 illustrating an ability of the ground mirror database to manage a fleet of vehicles.

FIG. 3 is a schematic of ground mirror database 58 of FIG. 2 to illustrate the ability of database 58 to manage a company's entire fleet of vehicles. As shown in FIG. 3, database 58 is organized as a hierarchical directory of folders, and includes three main folders 110, 112 and 114, which correspond to three fleets managed by the company. It is recognized that database 58 may include more than three fleets, or less than three fleets, and the fleets may be organized in numerous variations from what is shown in FIG. 3. Although folder 110 is described below in detail, each of the three fleets represented by folders 110, 112 and 114 may be organized in a similar manner.

Within folder 110 is a folder or directory for each of the airplanes characterized and managed under fleet 1. As shown in FIG. 3, fleet 1 includes four airplanes, but it is recognized that fleet 1 may include more or less airplanes. Each folder for each airplane corresponds to the primary onboard microserver for that airplane, similar to onboard microserver 56 of FIG. 2. Each folder includes, for example, five sub-folders or sub-directories that correspond to the subsystem microservers connected to the primary onboard microserver. The subsystem microservers are connected to the main subsystem controllers onboard an aircraft, which may include the two main engines, the electrical distribution system (EDS), the auxiliary power unit (APU) and the environmental control unit. Although five sub-folders are shown in FIG. 3, it is recognized that an aircraft may include additional subsystem microservers, and consequently the folder for that aircraft may include additional sub-folders.

For illustrative purposes, the folder under fleet 1 labeled airplane 1 corresponds to aircraft 52 of FIG. 2. As such, the airplane 1 folder of database 58 is a mirror image of primary onboard microserver 56 and any subsystem microservers on aircraft 52. The airplane 1 folder contains a duplicate copy of data stored and processed on primary onboard microserver 56. The #1 engine sub-folder within the airplane 1 folder contains a copy of data contained on subsystem microserver 60 for the #1 engine (see FIG. 2) of aircraft 52. Information contained within the airplane 1 folder is updated to reflect changes to airplane 1 whenever ground mirror database 58 is synchronized with onboard microserver 56 of aircraft 52. Communications sent to database 58, from any of users 92, 94, 96 and 98 of FIG. 2, that pertain to aircraft 52 are also contained within the folder of airplane 1. When database 58 is synchronized with onboard microserver 56, these communications are distributed to onboard microserver 56 of aircraft 52.

More specifically, users 92, 94, 96 or 98 may send a communication, such as a remote processing request, or an update that is specific to any of the subsystems on aircraft 52. For example, OEM 94 may send a service update for the #1 engine of aircraft 52; this update may be contained within the sub-folder for the #1 engine. Again, when database 58 is synchronized with onboard microserver 56 of aircraft 52, the update is disseminated to subsystem microserver 60 for the #1 engine. The management system described herein and shown in FIGS. 2 and 3 allows the information to be distributed down to a subsystem level of the aircraft, based on the configuration of a primary onboard microserver in combination with subsystem microservers.

Ground mirror database 58 allows information from users 92, 94, 96 and 98 to be disseminated onto a plurality of aircraft. As described above, database 58 may be used by an OEM to communicate that a recall has been issued for a particular part installed on aircraft 52. Commonly, the recall may affect numerous aircraft within a fleet operated by a company. Database 58 automates the process of disseminating the recall communication to all of the aircraft within the company's fleet or fleets that contain the particular part that has been recalled. Similarly, regulatory information from a government or regulatory agency also commonly affects a plurality of aircraft within the company's fleet. Again, database 58 is capable of determining which aircraft should receive a particular communication or transfer of information.

As another example, in the airline industry service updates for an engine may typically be communicated through a technical bulletin. Historically, the technical bulletin may be stored in an airline's library, electronic or otherwise. In preparing for an engine repair, a mechanic would commonly check the technical bulletins in the library to make sure there were no updates applicable to the particular engine that he or she was going to be working on. With the use of ground mirror database 58, the service update may be loaded onto ground mirror database 58 which then determines which aircraft include that particular engine. Ground mirror database 58 then disseminates the service update to the sub-folder for that engine for each of the identified aircraft. When the onboard microserver of each of those aircraft are synchronized with ground mirror database 58, the service update is sent to the subsystem microserver associated with that engine. Moreover, when the mechanic connects to that subsystem microserver, he or she may receive an electronic message that a service update has been loaded onto the subsystem microserver. The mechanic, and more importantly the company, may be confident that the mechanic has the most up to date information for that part because the information is stored on the subsystem microserver.

Continuing with the example of a mechanic performing an engine repair, if the mechanic makes a change to the engine, say for example he replaces the oil pump, this replacement is captured on the subsystem microserver for that engine. The next time the onboard microserver synchronizes with ground mirror database 58, this change, including an identification (through RFID tracking) of the new replacement part, is loaded onto ground mirror database 58. Moreover, this updated information may also be communicated by database 58 to OEM 94, who may use this information for better projecting future spare parts production schedules, repairs or replacements.

In addition to the capabilities described above, ground mirror database 58 provides a company the ability to easily study and analyze data compiled for all of its aircraft to aid in operating decisions. For example, the data allows the company to determine which aircraft are operating most efficiently and economically, and why.

Although the management system described herein has been described in the context of a fleet of aircraft and the airline industry, it is recognized that this business architecture may be used for any type of vehicle, including space, marine and land vehicles.

Although the present invention has been described with reference to preferred embodiments, workers skilled in the art will recognize that changes may be made in form and detail without departing from the spirit and scope of the invention.

The invention claimed is:

1. A system for global product management, the system comprising:
    an onboard microserver located on a vehicle, wherein the onboard microserver comprises:
        a computer processor for collecting and processing data for the vehicle;
        memory for storing data for the vehicle; and
        a web-based server enabling local and remote communications to and from the onboard microserver using standard internet protocols;
    a plurality of subsystem microservers configured to communicate with the onboard microserver and each other, wherein at least one of the subsystem microservers is connected to a subsystem controller on the vehicle and the subsystem controller is selected from a group consisting of an engine controller, an auxiliary power unit controller, an environmental control unit controller, and an electrical distribution system controller; and
    a database configured to be located remote of the vehicle and include a replica of data contained on the onboard microserver and the subsystem microservers, wherein the database and the onboard microserver are configured for two-way communications and two-way data transfers, and wherein the plurality of subsystem microservers are configured to communicate with the database only through the onboard microserver.

2. The system of claim 1 wherein data on the database is accessible by a plurality of users.

3. The system of claim 2 wherein the database grants access to specific portions of data on the database to designated users.

4. The system of claim 2 wherein the database includes security protocols designed to limit access to the database to designated users.

5. The system of claim 2 wherein the data is accessible relative to the vehicle locally through the onboard microserver and remotely through the database.

6. The system of claim 2 wherein the database is configured to send and receive communications to and from the users locally or remotely.

7. The system of claim 2 wherein the database is configured to enable the users to have two-way communications and two-way data transfers with the onboard microserver through the database.

8. The system of claim 2 wherein at least one of the subsystem microservers is attached to a subsystem controller on the vehicle and the database is configured to enable a user to control operation of the subsystem controller through the database.

9. The system of claim 1 wherein the database and the onboard microserver are configured to communicate with each other remotely.

10. The system of claim 1 wherein the vehicle is an aircraft.

11. The system of claim 1 wherein two-way communications and two-way data transfers between the database and the onboard microserver includes a synchronization of the database and the onboard microserver.

12. The system of claim 11 wherein the synchronization is performed by communication means selected from a group consisting of radio frequency, optical, wired, wireless, satellite and cellular.

13. The system of claim 11 further comprising:
    a program for determining when the synchronization is performed.

14. The system of claim 1 wherein the onboard microserver further comprises at least one of embedded algorithms and intelligent agent technology.

15. A method of managing a vehicle, the method comprising:
    integrating an onboard microserver system on the vehicle for collecting, storing and processing information for the vehicle, wherein the onboard microserver system includes a primary onboard microserver and at least one subsystem microserver connected to a subsystem controller on the vehicle, wherein the subsystem controller is selected from a group consisting of an engine controller, an auxiliary power unit controller, an environmental control unit controller, and an electrical distribution system controller;
    creating a ground database configured to be located remotely from the vehicle and include a replica of information contained within the onboard microserver system; and
    enabling two-way communication between the onboard microserver system and the ground database, wherein the at least one subsystem microserver communicates with the ground database only through the onboard microserver.

16. The method of claim 15 wherein the vehicle is an aircraft.

17. The method of claim 15 further comprising:
    enabling a plurality of users to access information stored on the ground database and send information to the ground database.

18. The method of claim 17 wherein information sent to the ground-database by one or more of the plurality of users is communicated by the ground database to the onboard microserver system.

19. The method of claim 17 wherein the plurality of users is selected from a group consisting of equipment manufacturers, maintenance personnel, airline operators, government entities, and regulatory entities.

20. The method of claim 17 wherein the at least one subsystem microserver is connected to at least one subsystem controller, and the method further comprises enabling at least one user to control operation of the at least one subsystem controller through the ground database.

21. The method of claim 15 wherein enabling two-way communication between the onboard microserver system and the ground database includes a two-way synchronization of information between the onboard microserver system and the ground database.

22. The method of claim 21 wherein the synchronization is performed by communication means selected from a group consisting of radio frequency, optical, wired, wireless, satellite, and cellular.

23. The method of claim 21 wherein the synchronization is performed as a function of time lapsed since a prior synchronization.

24. The method of claim 21 wherein the synchronization is performed if there is an urgent communication or an emergency event.

25. The method of claim 15 wherein the at least one subsystem microserver connected to a subsystem controller is configured to store and process information for the subsystem controller.

26. The method of claim 15 wherein the onboard microserver system further comprises at least one of embedded algorithms and intelligent agent technology.

27. A method of managing a fleet of vehicles, the method comprising:
configuring an onboard microserver system on each vehicle, wherein the microserver system includes an onboard microserver configured to collect, process and store data about the vehicle, and enable remote and local communications with the vehicle, and a plurality of subsystem microservers configured to communicate with the onboard microserver and with one another, each of the plurality of subsystem microservers connected to a subsystem controller on the vehicle wherein the subsystem controller is selected from a group consisting of an engine controller, an auxiliary power unit controller, an environmental control unit controller, and an electrical distribution system controller;
utilizing a portal to store a duplicate copy of data on the onboard microserver system;
enabling access to the data on the portal to a plurality of users; and
enabling a two-way data gateway between the portal and the onboard microserver system wherein the plurality of subsystem microservers are configured to communicate with the portal only through the onboard microserver.

28. The method of claim 27 wherein enabling a two-way data gateway between the portal and the onboard microserver system includes a synchronization of data on the microserver system and the portal.

29. The method of claim 27 wherein enabling a two-way data gateway includes wireless communication between the onboard microserver system and the portal.

30. The method of claim 29 wherein communication between the onboard microserver system and the portal includes communication means selected from a group consisting of radio frequency, optical, wired, wireless, satellite, and cellular.

31. The method of claim 27 wherein enabling access to the data on the portal to a plurality of users includes security measures for restricting access to the portal to designated users.

32. The method of claim 27 wherein enabling access to the data on the portal to a plurality of users includes designating portions of the data to specific users.

33. The method of claim 27 further comprising:
enabling a plurality of users to communicate with the onboard microserver system by routing communications through the portal.

34. The method of claim 27 wherein enabling a two-way data gateway between the portal and the onboard microserver system includes enabling a user to control operation of a subsystem on a vehicle by communicating through the portal with an onboard microserver system for that vehicle.

35. The method of claim 27 wherein the fleet of vehicles is a fleet of aircraft.

* * * * *